(12) United States Patent
Ou et al.

(10) Patent No.: US 8,599,553 B2
(45) Date of Patent: Dec. 3, 2013

(54) HANDHELD ELECTRONIC DEVICE (75) Inventors: Tsung-Yuan Ou, Taoyuan County (TW); Chih-Wei Tai, Taoyuan County (TW)

(73) Assignee: HTC Corporation, Taoyuan County (TW)

(*) Notice: Subject to any disclaimer, the term of this patent is extended or adjusted under 35 U.S.C. 154(b) by 341 days.

(21) Appl. No.: 13/013,839

(22) Filed: Jan. 26, 2011

(65) Prior Publication Data
US 2012/0019993 A1 Jan. 26, 2012

(30) Foreign Application Priority Data
Jul. 20, 2010 (TW) ............................... 99123842 A (51) Int. Cl.
H04M 1/00 (2006.01)
H05K 5/00 (2006.01)
H05K 7/00 (2006.01)
G06F 1/16 (2006.01)

(52) U.S. Cl.
USPC ................. 361/679.56; 361/679.3; 455/575.4

(58) Field of Classification Search
USPC ............................ 361/679.21–679.3, 679.56; 455/575.1–575.4
See application file for complete search history.

(56) References Cited

U.S. PATENT DOCUMENTS

| | | | |
|---|---|---|---|
| 7,627,337 B2 | 12/2009 | Maatta et al. | |
| 8,046,037 B2* | 10/2011 | Jang | 455/575.4 |
| 8,086,290 B2* | 12/2011 | Yoon et al. | 455/575.4 |
| 8,385,992 B2* | 2/2013 | Davidson et al. | 455/575.4 |
| 2008/0051041 A1* | 2/2008 | Griffin et al. | 455/90.3 |
| 2008/0161075 A1* | 7/2008 | Kim et al. | 455/575.4 |
| 2008/0304217 A1* | 12/2008 | Lai et al. | 361/681 |
| 2009/0009423 A1* | 1/2009 | Huang et al. | 345/1.1 |
| 2009/0093285 A1* | 4/2009 | Weng et al. | 455/575.4 |
| 2010/0123646 A1 | 5/2010 | Richardson | |
| 2010/0159993 A1* | 6/2010 | Davidson et al. | 455/566 |
| 2011/0188187 A1* | 8/2011 | Barnett et al. | 361/679.01 |

FOREIGN PATENT DOCUMENTS

| | | |
|---|---|---|
| GB | 2350516 | 11/2000 |
| WO | 2010022796 | 3/2010 |

OTHER PUBLICATIONS

"Search Report of European Counterpart Application", issued on Oct., 10, 2011, p. 1-p. 3., in which the listed references were cited.
"Office Action of European Counterpart Application", issued on Jan. 20, 2012, p. 1-p. 4.
"Office Action of Taiwan Counterpart Application", issued on May 17, 2013, p. 1-p. 6, in which the listed reference was cited.
"Office Action of Europe Counterpart Application", issued on Apr. 15, 2013, p. 1-p. 5.

* cited by examiner

*Primary Examiner* — Adrian S Wilson
(74) *Attorney, Agent, or Firm* — Jianq Chyun IP Office (57) ABSTRACT

A handheld electronic device including a first body, a second body, a third body, a gear set and a pivot member pivoted on the first body is provided. The second body having a first rack is slidably coupled with the first body. The third body having a second rack is slidably coupled with the pivot member. The gear set is disposed on the first body and coupled with the first rack and the second rack. When the third body shifts a first distance relative to the first body along a first operating direction and drives the gear set, the second body is driven to shift with respect to the first body along a second operating direction opposite to the first operating direction and exposed by the third body. After the second body is exposed by the third body, the third body is tilted with respect to the first body.

10 Claims, 13 Drawing Sheets

HANDHELD ELECTRONIC DEVICE

CROSS-REFERENCE TO RELATED APPLICATION

This application claims the priority benefit of Taiwan application serial No. 99123842, filed on Jul. 20, 2010. The entirety of the above-mentioned patent application is hereby incorporated by reference herein and made a part of this specification.

BACKGROUND OF THE INVENTION

1. Field of the Invention

The present application relates to an electronic apparatus. More particularly, the present application relates to a handheld electronic apparatus.

2. Description of Related Art

With advancement of information technology at present, it becomes easier and easier to obtain necessary information from daily-used electronic devices. On the other hand, relying on the dramatic improvement of the state of the art, handheld electronic devices are developed to be lighter and slimmer. Being advantaged in portability, handheld electronic devices are popular and broadly used in our daily life.

Taking the cell phones as an example, various types of cell phones such as bar type, folded type, rotate type, slide type, etc. are proposed to meet different preferences and requirements. In respect to slide type cell phone, two bodies are slidely coupled together to be operated in an expanding mode and a retracting mode. Stacking the two bodies facilitates minimizing dimensions of the slide type cell phone, while the two bodies are expanded in specific operating mode. With the advancement of touch screen technology, cell phone touch screen functions gradually replace conventional key press functions. Thus, the subject of debate is how to pair a larger usable surface on a cell phone body that has limited space.

SUMMARY OF THE INVENTION

The present application is directed to a handheld electronic device with large usable surface area, so as to increase the flexibility of the arrangement of components.

As embodied and broadly described herein, the application provides a handheld electronic device including a first body, a pivot member, a second body, a third body, and a gear set. The pivot member is pivoted on the first body. The second body has a first rack and is slidably coupled with the first body. The third body has a second rack and is slidably coupled with the pivot member, and the second body is stacked between the first body and the third body. The gear set is disposed on the first body and coupled with the first rack and the second rack. When the third body shifts a first distance relative to the first body along a first operating direction and drives the gear set with the second rack, the second body is driven by the first rack to shift with respect to the first body along a second operating direction opposite to the first operating direction and exposed by the third body, and then the third body is tilted with respect to the first body by the pivot member pivoted on the first body.

Accordingly, the second body of the application is stacked between the first and third bodies. The third body utilizes the gear set to drive the second body. This way, the third body and the second body move along opposite directions so that the second body is exposed by the third body. Next, the third body tilts relatively to the first body, combining the third body and the second body, so that the handheld electronic device has a larger usable surface.

In order to make the aforementioned and other features and advantages of the application more comprehensible, embodiments accompanying figures are described in detail below.

DESCRIPTION OF EMBODIMENTS

Figure 1A:
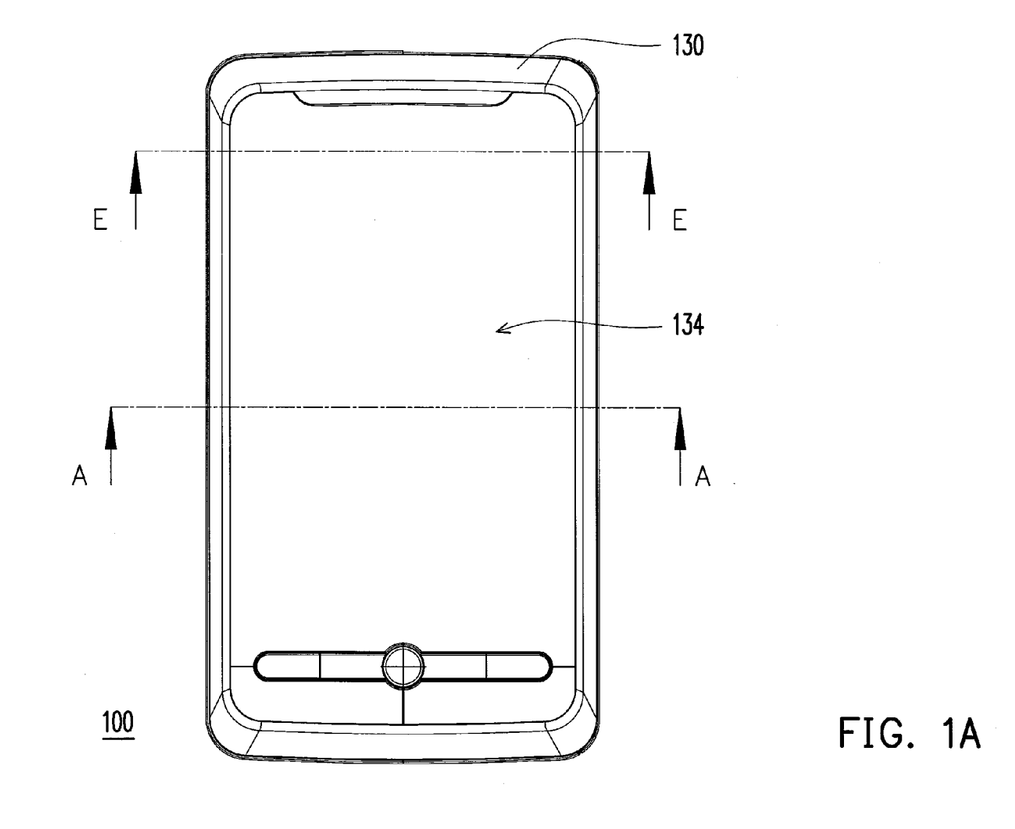
FIGS. 1A through 1D show an operating process of a handheld electronic device according to one embodiment of the application.
Figure 1B:
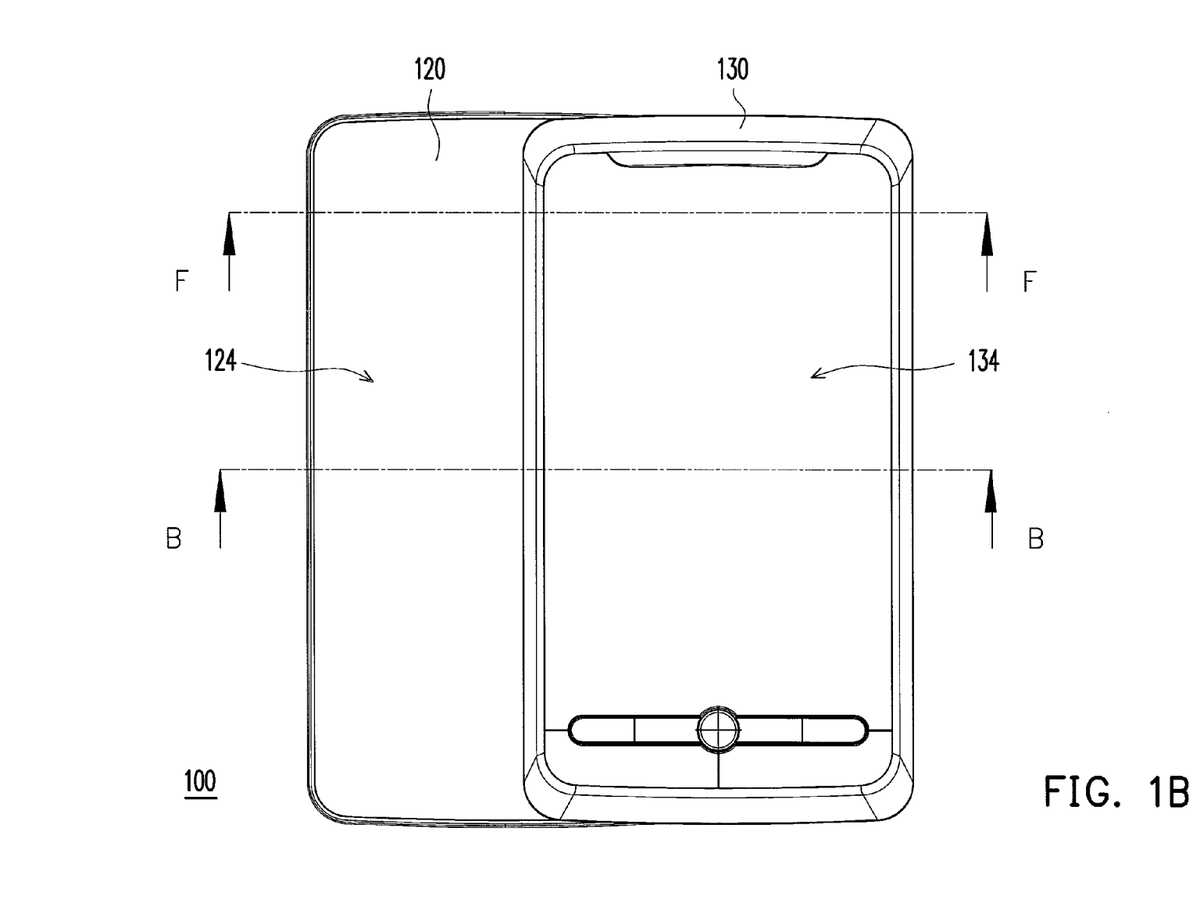
Figure 1C:
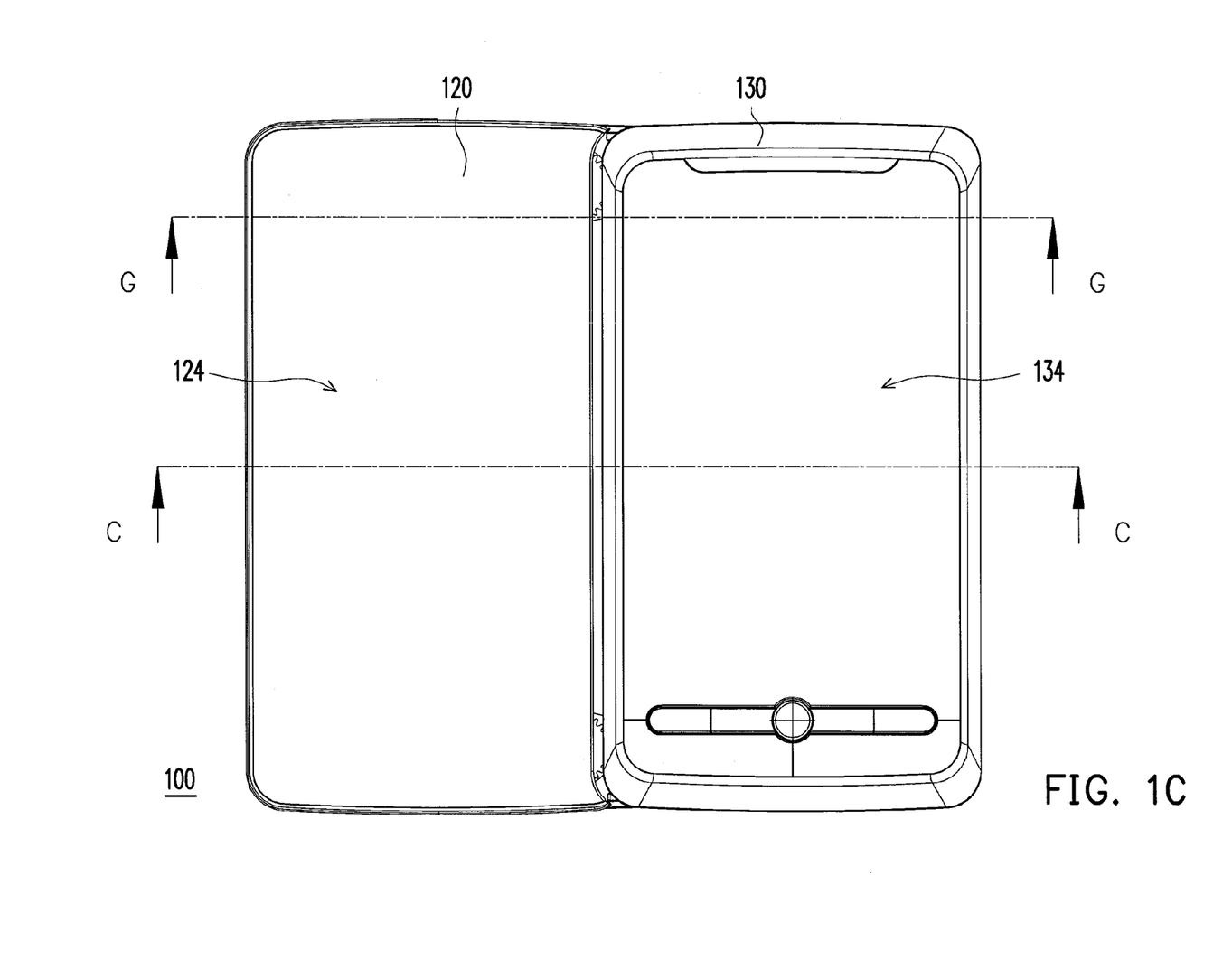
Figure 1D:
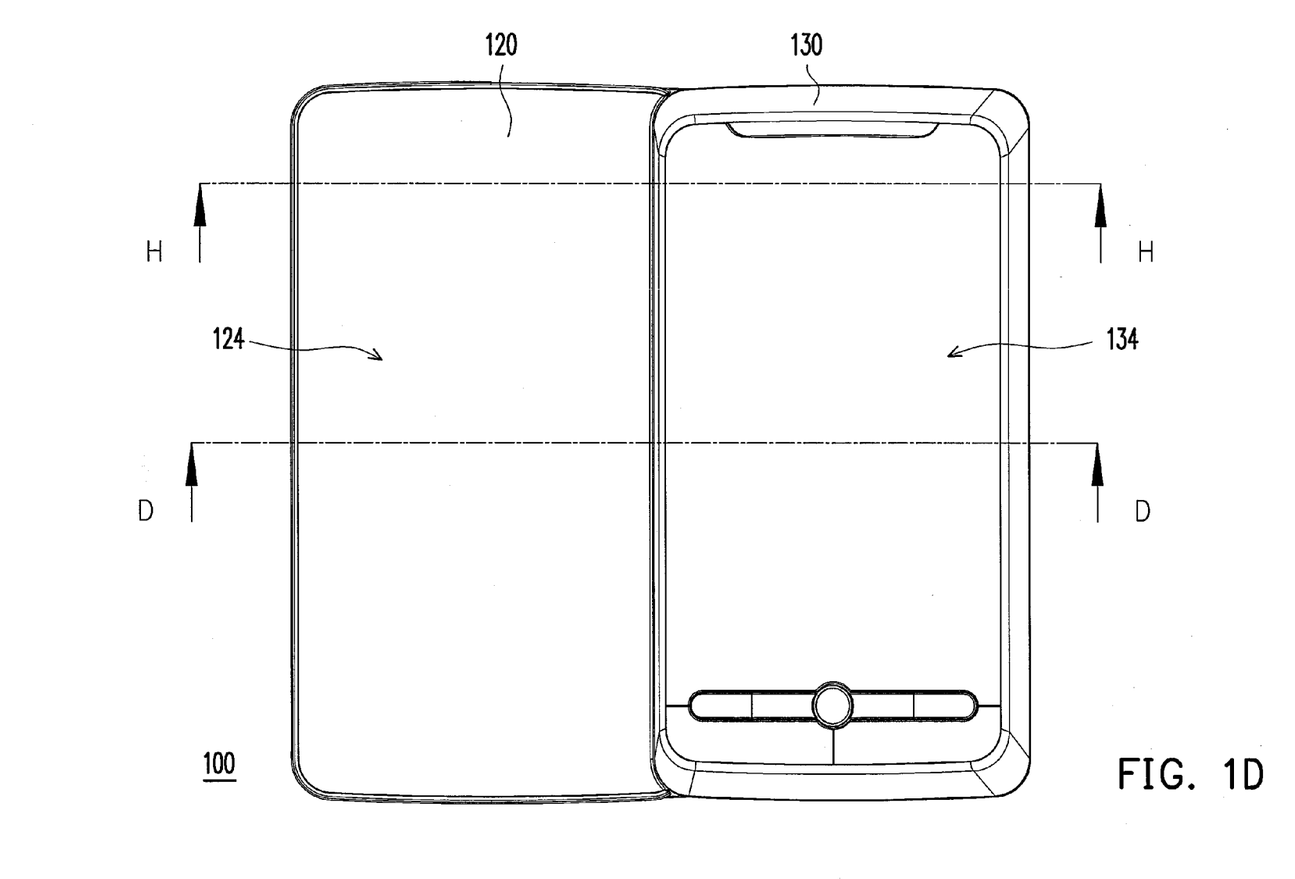
Figure 2A:
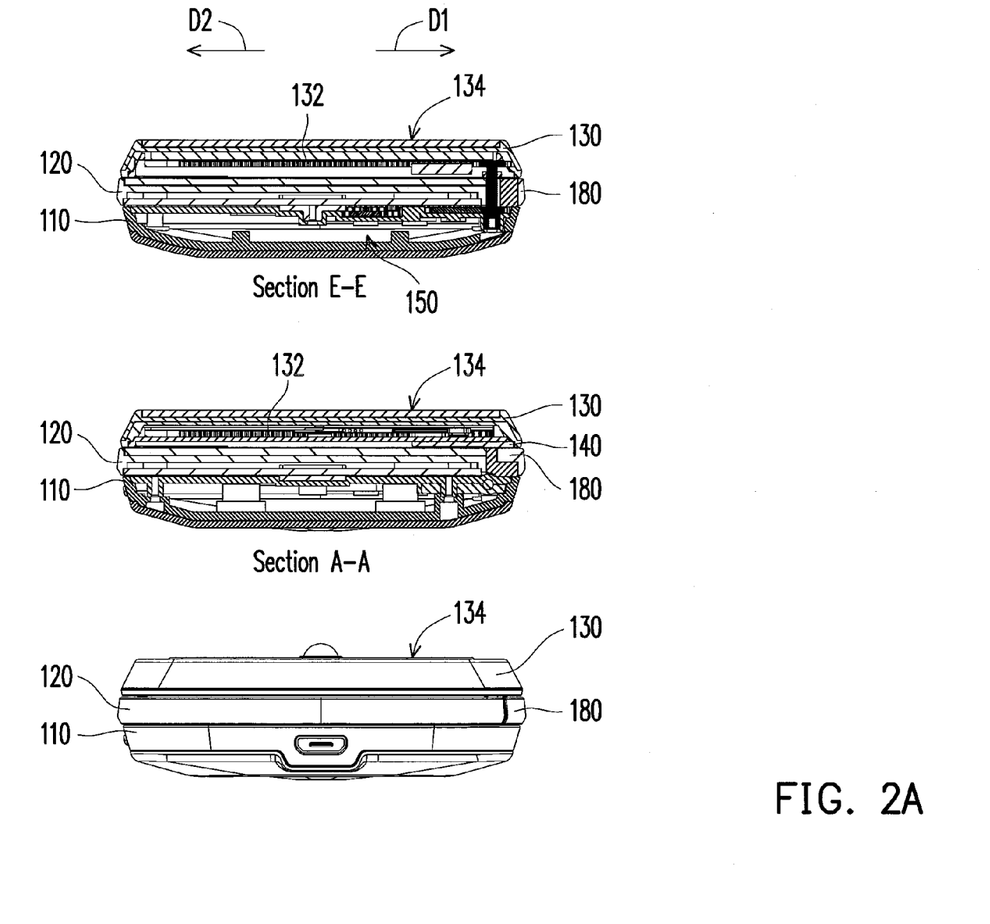
FIG. 2A shows a schematic cross-sectional view along line E-E, a schematic cross-sectional view along line A-A, and a side view of the handheld electronic device illustrated in FIG. 1A.
Figure 2B:
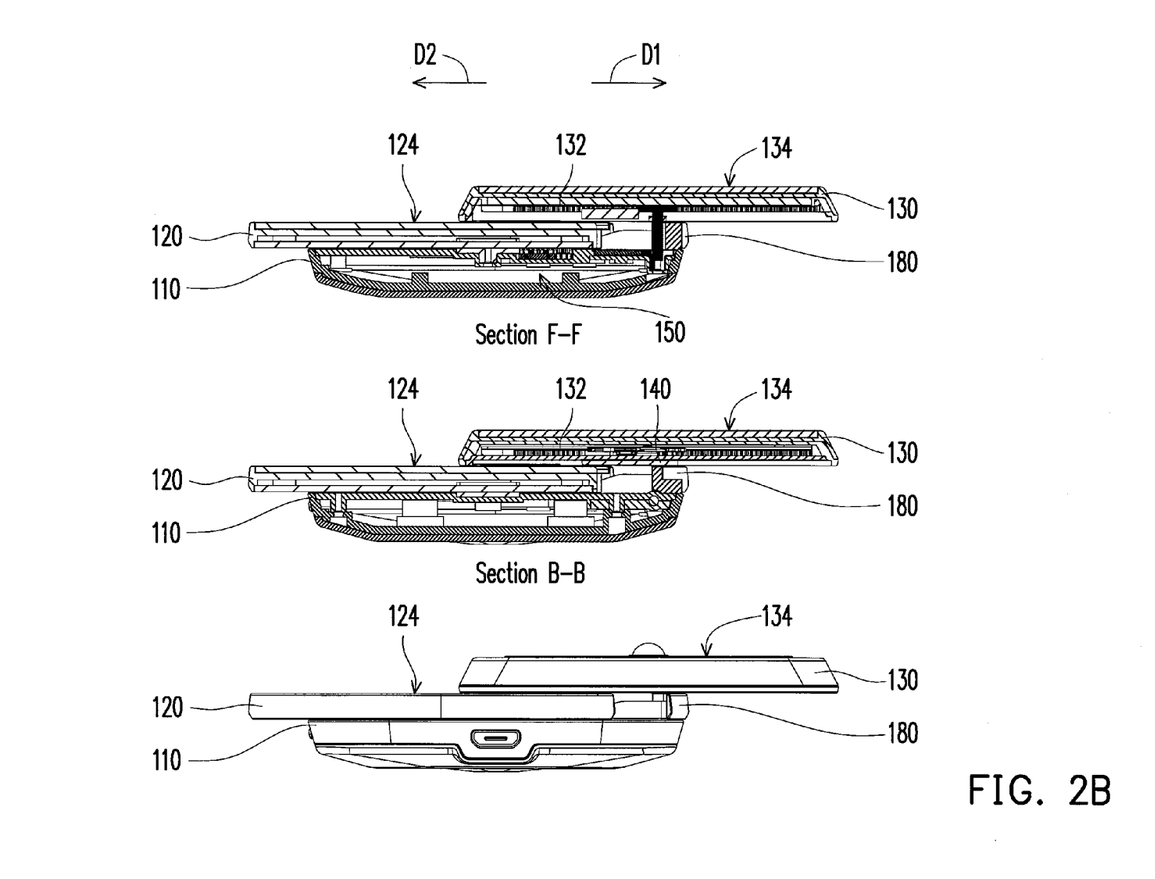
FIG. 2B shows a schematic cross-sectional view along line F-F, a schematic cross-sectional view along line B-B, and a side view of the handheld electronic device illustrated in FIG. 1B.
Figure 2C:
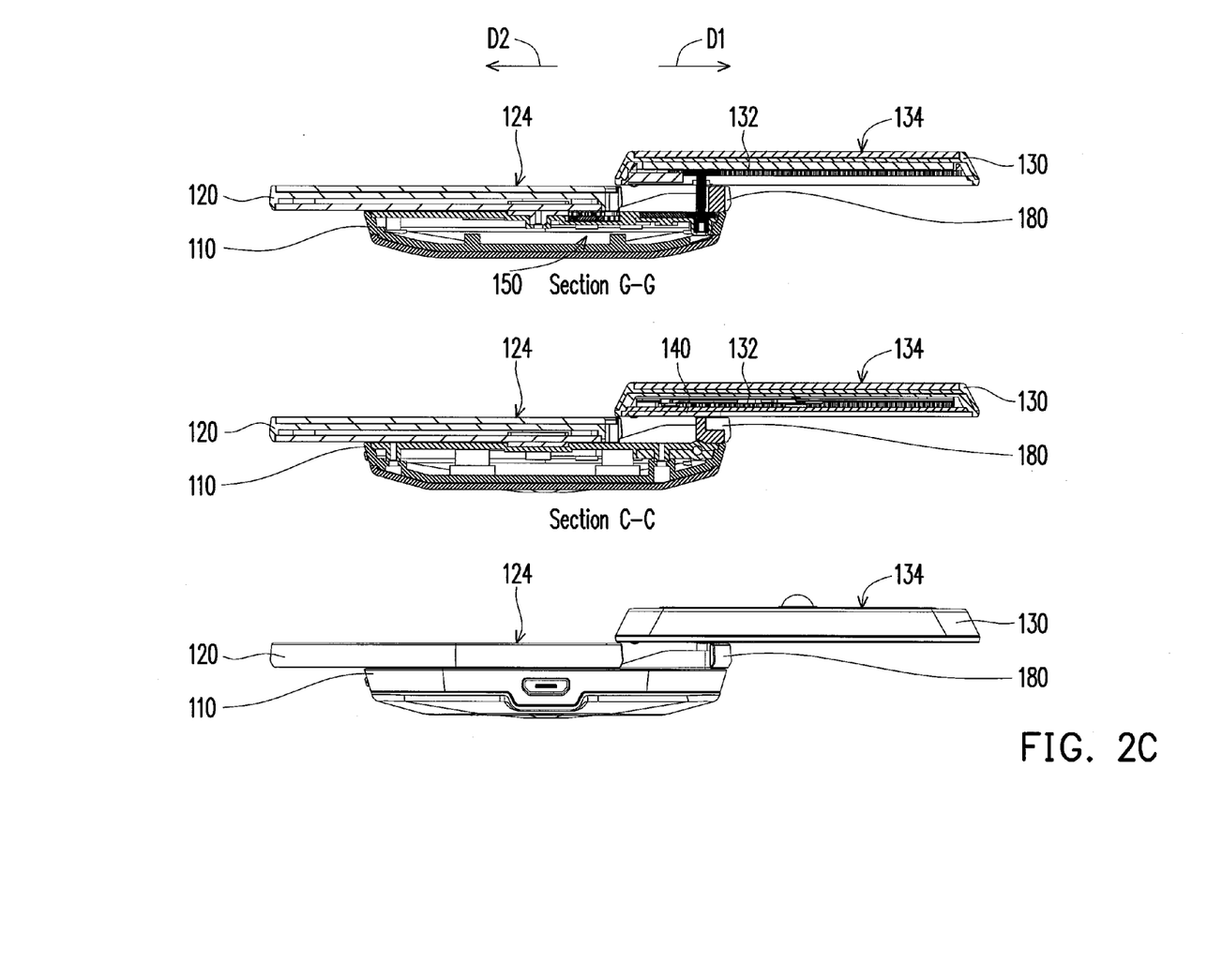
FIG. 2C shows a schematic cross-sectional view along line G-G, a schematic cross-sectional view along line C-C, and a side view of the handheld electronic device illustrated in FIG. 1C.
Figure 2D:
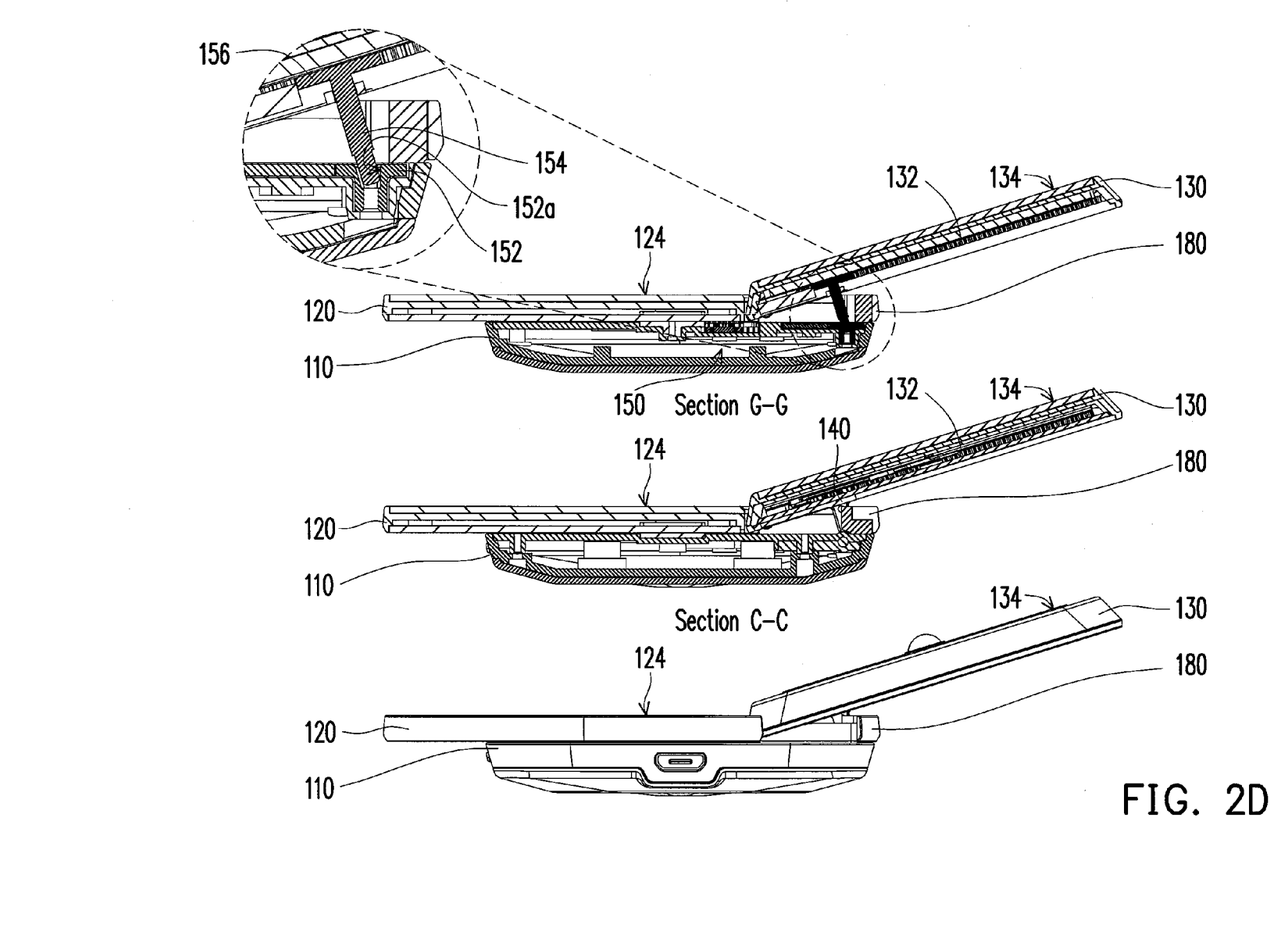
FIG. 2D shows a schematic cross-sectional view along line H-H, a schematic cross-sectional view along line D-D, and a side view of the handheld electronic device illustrated in FIG. 1D.
Figure 3A:
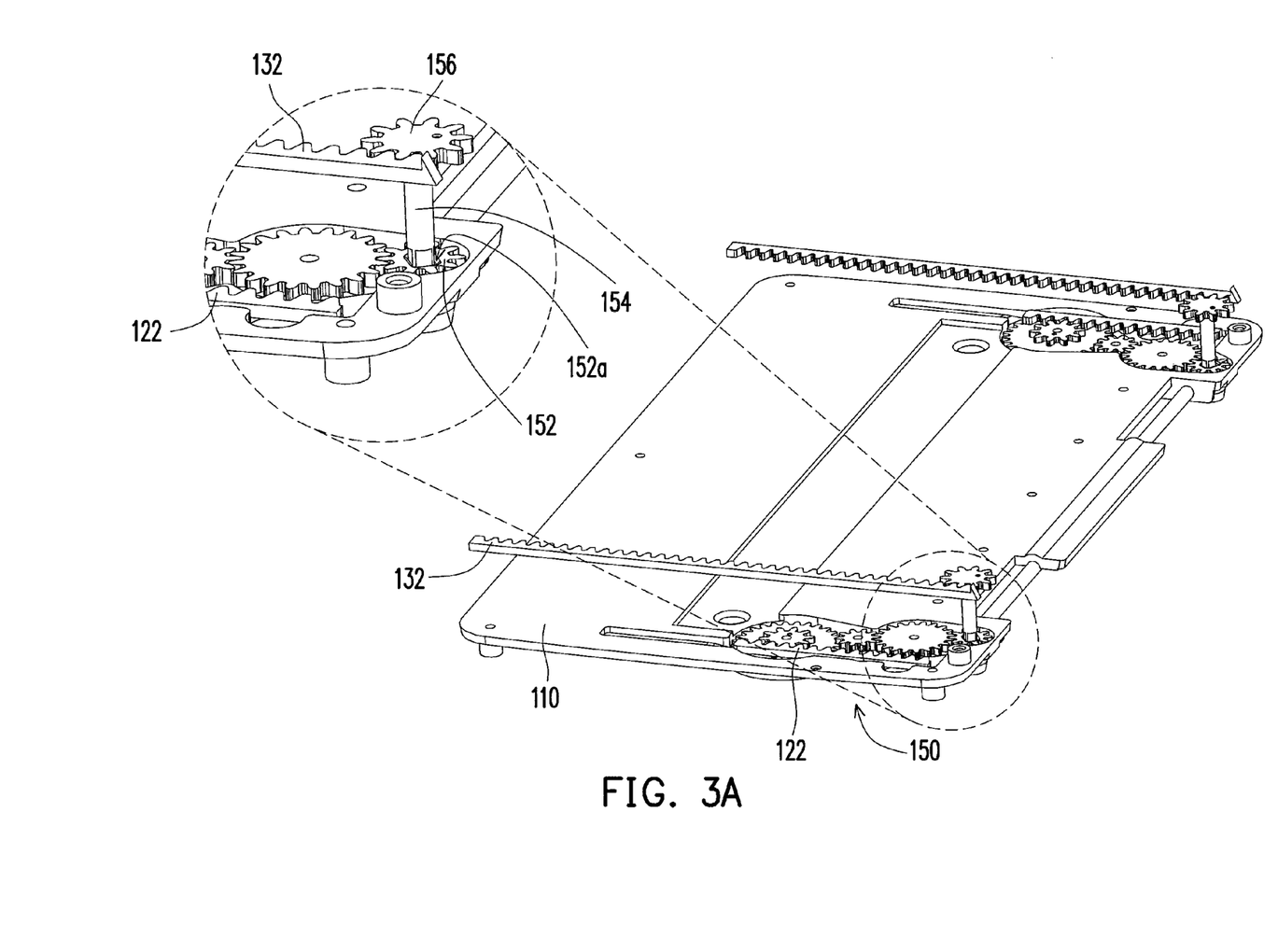
FIGS. 3A through 3D are perspective views respectively showing a part of members of the handheld electronic device of FIG. 1A through 1D.
Figure 3B:
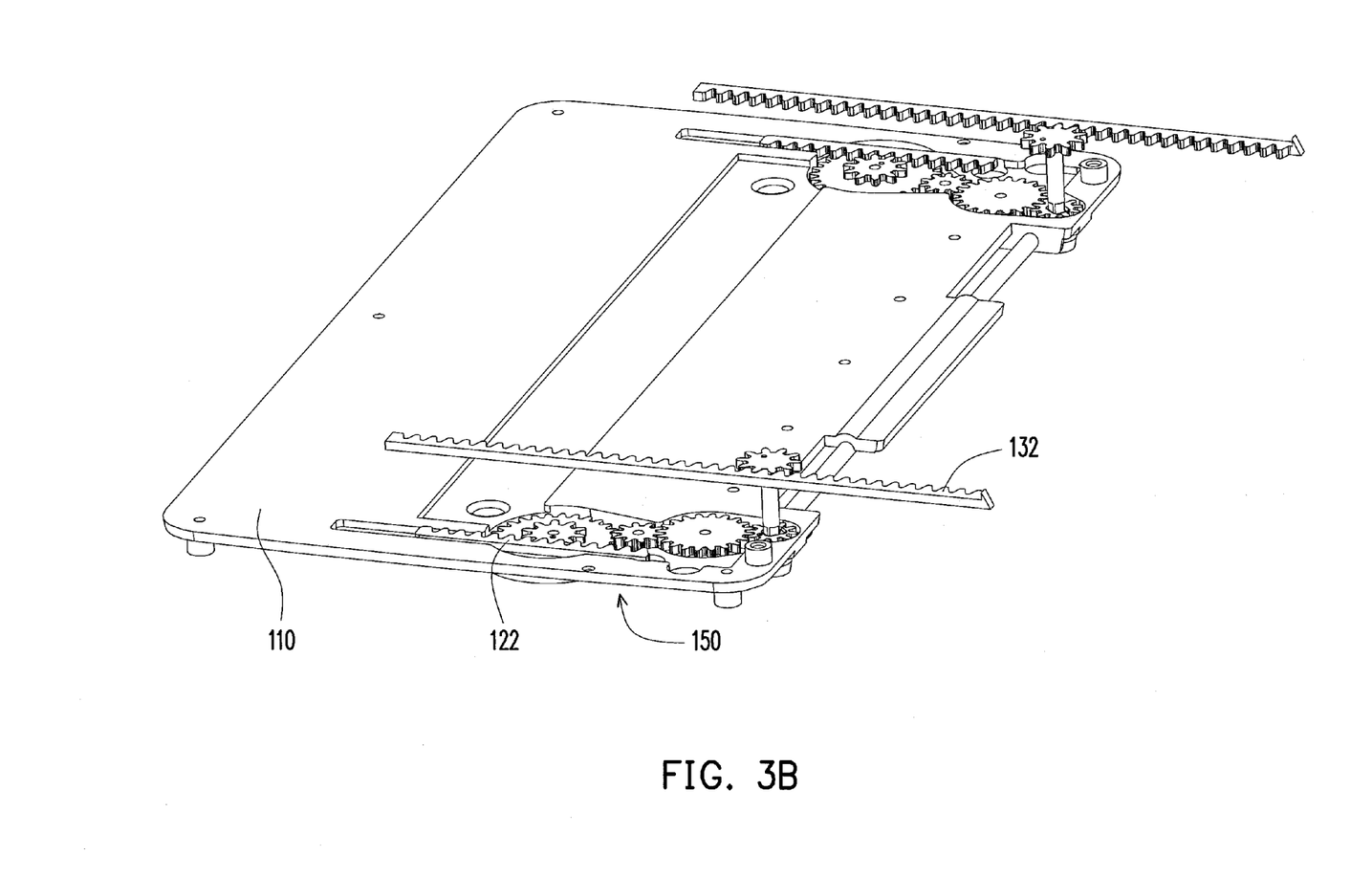
Figure 3C:
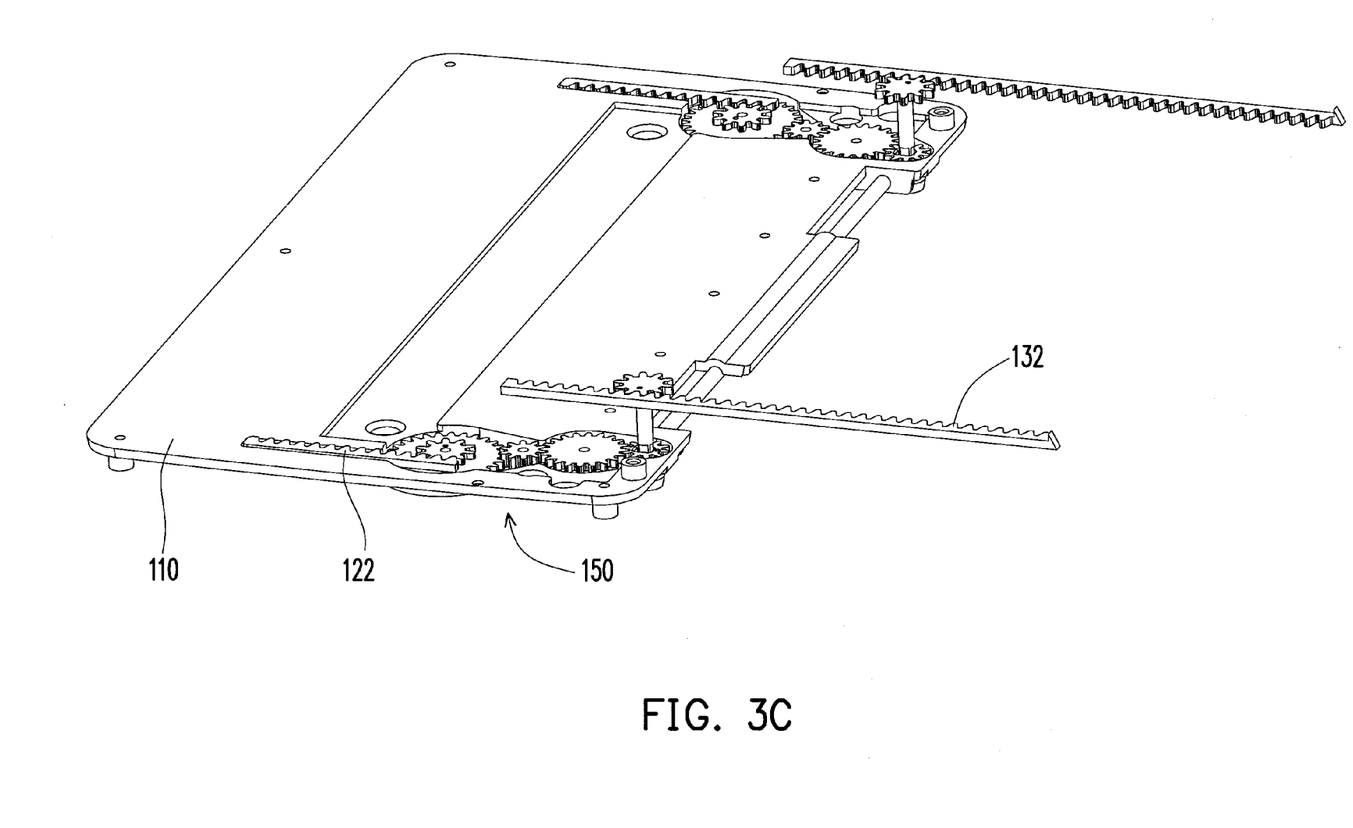
Figure 3D:
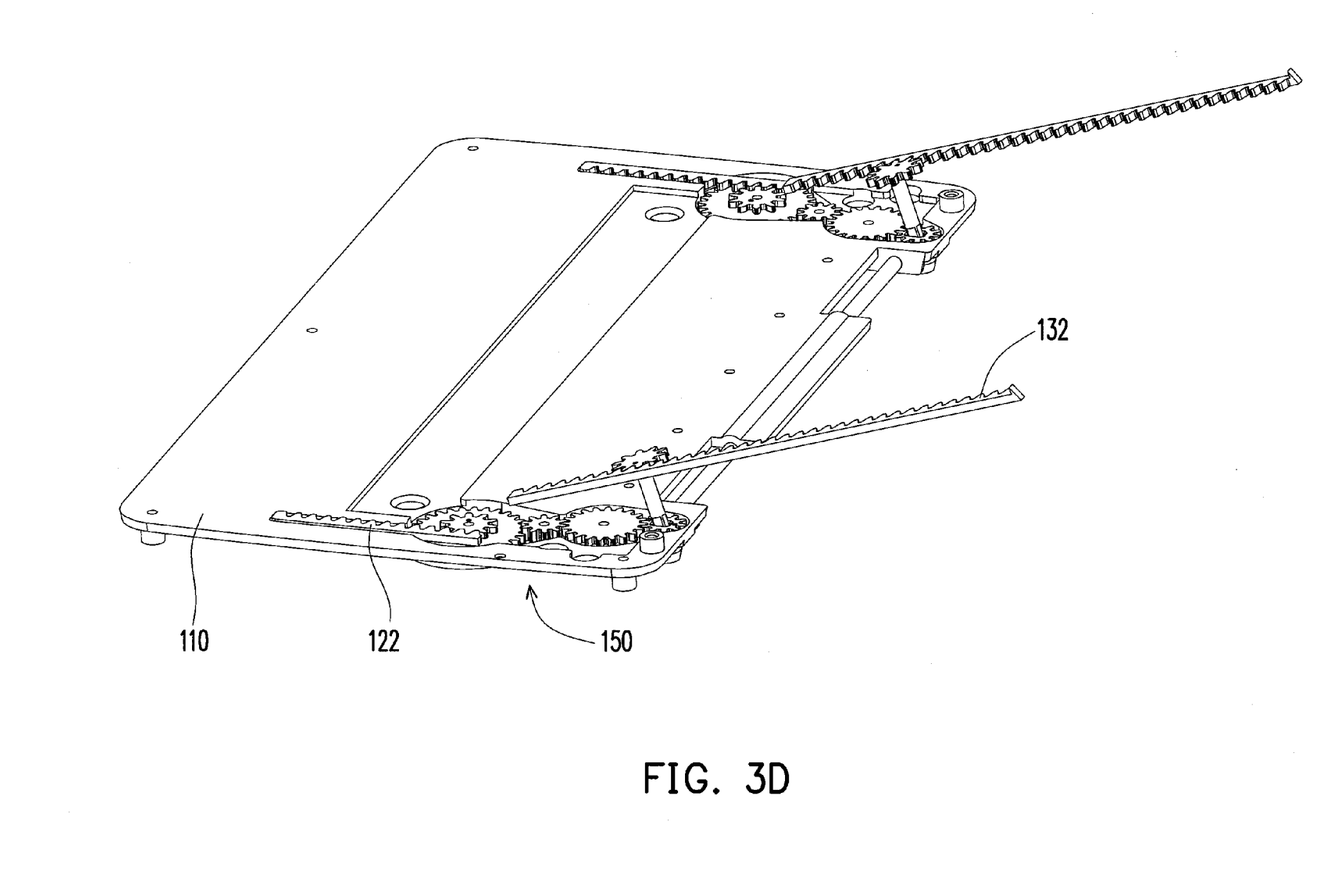
Figure 4:
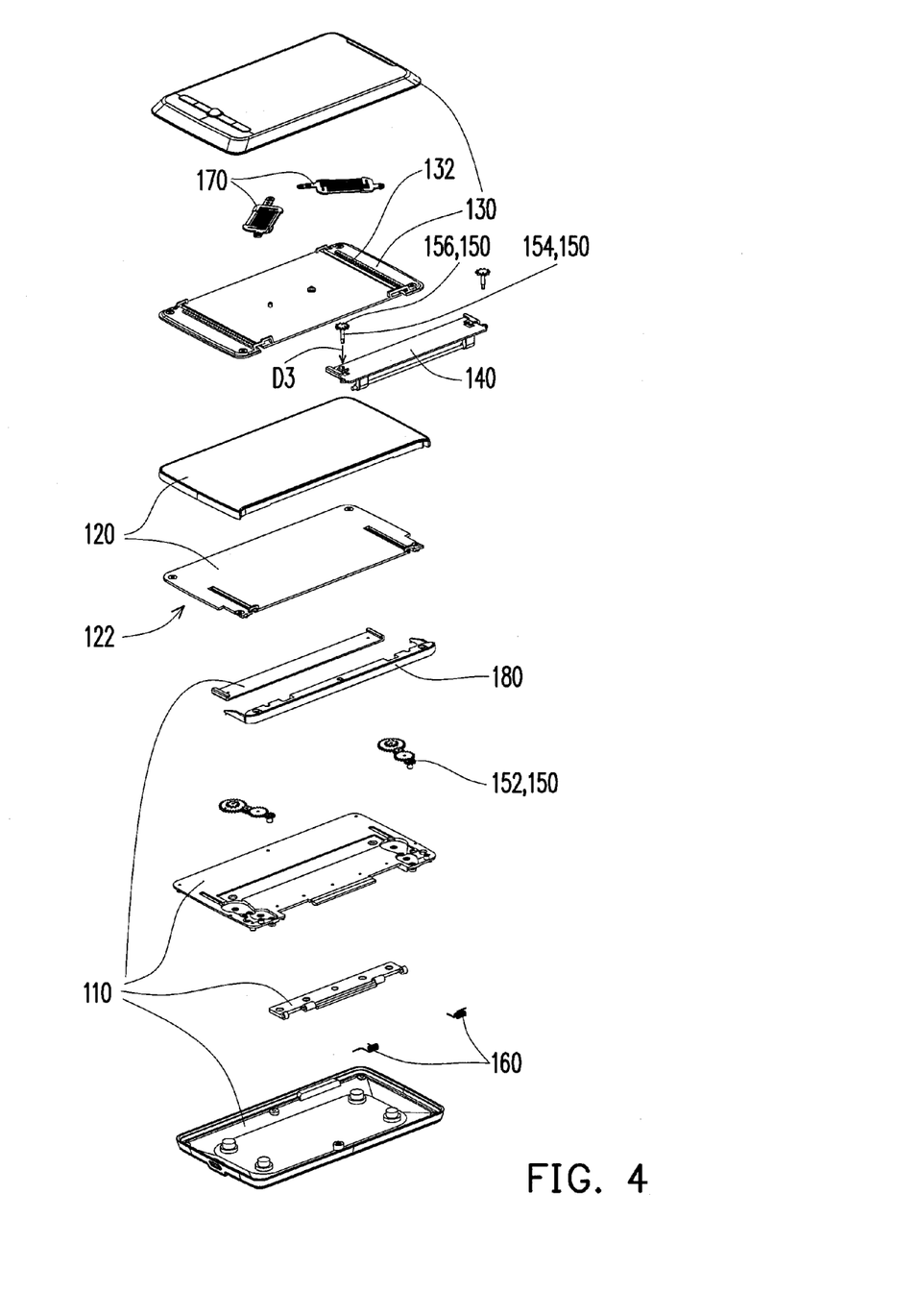
FIG. 4 is an explosive view of the handheld electronic device of FIG. 1.

FIGS. 1A through 1D show an operating process of a handheld electronic device according to one embodiment of the application. FIG. 2A shows a schematic cross-sectional view along line E-E, a schematic cross-sectional view along line A-A, and a side view of the handheld electronic device illustrated in FIG. 1A. FIG. 2B shows a schematic cross-sectional view along line F-F, a schematic cross-sectional view along line B-B, and a side view of the handheld electronic device illustrated in FIG. 1B. FIG. 2C shows a schematic cross-sectional view along line G-G, a schematic cross-sectional view along line C-C, and a side view of the handheld electronic device illustrated in FIG. 1C. FIG. 2D shows a schematic cross-sectional view along line H-H, a schematic cross-sectional view along line D-D, and a side view of the handheld electronic device illustrated in FIG. 1D. FIGS. 3A through 3D are perspective views respectively showing a part of members of the handheld electronic device of FIG. 1A through 1D. FIG. 4 is an explosive view of the handheld electronic device of FIG. 1. Referring to FIGS. 1A, 2A, 3A and 4, the handheld electronic device 100 of the present embodiment includes a first body 110, a second body 120, a third body 130, pivot members 140 and gear sets 150.

The pivot member 140 is pivoted on the first body 110. The second body 120 is slidably coupled with the first body 110 and has two first racks 122. The third body 130 is slidably coupled with the pivot member 140 and has two second racks 132. When the handheld electronic device 100 is retracted, the second body 120 is stacked between the first body 110 and the third body 130 as shown in FIG. 2A. The gear sets 150 are disposed on the first body 110 and coupled with the first racks 122 and the second racks 132.

The user can push the third body 130 to shift with respect to the first body 110 along a first operating direction D1 as shown in FIGS. 2A through 2C, and thereby drives the gear sets 150 with the second racks 132. The second body 120 can be driven by the gear sets 150 with the first racks 122 to shift with respect to the first body 110 along a second operating direction D2 opposite to the first operating direction D1 as shown in FIGS. 2A through 2C. Accordingly, the handheld electronic device 100 is transformed from the state as shown in FIGS. 1A, 2A and 3A to the state as shown in FIGS. 1B, 2B and 3B, wherein the second body 120 is partially exposed by the third body 130.

Then, the user can push the third body 130 to proceed to shift with respect to the first body 110 along the first operating direction D1 and drives the gear sets 150 with the second racks 132. Thereby, the second body 120 can be driven by the gear sets 150 with the first racks 122 to proceed to shift with respect to the first body 110 along the second operating direction D2 opposite to the first operating direction D1. Accordingly, the handheld electronic device 100 is transformed from the state as shown in FIGS. 1B, 2B and 3B to the state as shown in FIGS. 1C, 2C and 3C, wherein the second body 120 is entirely exposed by the third body 130.

After the second body 120 is entirely exposed by the third body 130, the third body 130 can be tilted with respect to the first body 110 by the pivot members 140 pivoted on the first body. In other words, the handheld electronic device 100 is transformed from the state as shown in FIGS. 1C, 2C and 3C to the state as shown in FIGS. 1D, 2D and 3D. By which, the displaying surface 134 on the third body 130 and the displaying surface 124 of the second body 120 are combined to provide the user a larger displaying and operating interface.

More specifically, when the third body 130 is tilted with respect to the first body 110 as shown in FIGS. 1D and 2D, the third body 130 leans against the second body 120, such that the displaying surface 134 and the displaying surface 124 are adapted to displaying two interactive frames or two individual frames respectively, or together displaying a whole frame.

Referring to FIG. 4, in the present embodiment, the handheld electronic device 100 may further comprises elastic members 160 connected between the first body 110 and the pivot members 140. When the second body 120 is exposed by the third body 130 as shown in FIGS. 1C and 2C, the pivot members 140 rotate with respect to the first body 110 by elastic force of the elastic members and drive the third body 130 to tilt with respect to the first body 110 as shown in FIGS. 1D and 2D.

In the present embodiment, the elastic members 160 are torsion springs, for example. In the states as shown from FIG. 2A to FIG. 2B, the elastic members 160 are stressed between the pivot members 140 and the first body 110 and stores an elastic potential energy. As the elastic members 160 are in the state of FIG. 2C, the pivot members 140 have freedom of rotating with respect to the first body 110, and the elastic potential energy stored in the elastic members 160 can be released to drive the pivot members 140 to rotate with respect to the first body 110 and drive the third body 130 to tilt with respect to the first body 110.

Furthermore, referring to FIG. 4, in the present embodiment, the handheld electronic device 100 further comprises elastic members 170 connected between the third body 130 and the pivot members 140. The elastic members 170 store or release elastic potential energy in the process of the third body 130 shifting with respect to the first body 110, so as to provide kinetic energy for the third body 130 to move with respect to the first body 110 for the user to push the third body 130 with ease as retracting or spreading the handheld electronic device 100.

The elastic members 170 of the present embodiment may be compression springs or coil springs, which are capable of accomplishing semi-auto sliding function of the handheld electronic device 100. More specifically, in the process of shifting the third body 130 from the state as shown in FIG. 2A to the state as shown in FIG. 2C, the user needs to counteract the elastic force of the elastic members 170 to push the third body 130 to a critical position, and then the elastic members 170 start to release the stored elastic potential energy to drive the third body 130 shifting to the position as shown in FIG. 2C automatically. Similarly, in the process of drawing the third body 130 from the state as shown in FIG. 2C back to the state as shown in FIG. 2A, the user needs to counteract the elastic force of the elastic members 170 to push the third body 130 to a critical position, and then the elastic members 170 start to release the stored elastic potential energy to drive the third body 130 shifting to the position as shown in FIG. 2A automatically.

Referring to FIG. 3A, in the present embodiment, the gear set 150 includes a passive gear 152, a tilting rod 154 and a driving gear 156. The passive gear 152 is coupled with the first rack 122 via other gears of the gear set 150, and the passive gear 152 has a slot 152a. An end of the tilting rod 154 is disposed in the slot 152a and adapted to swing with respect to the slot 152a. The driving gear 156 is coupled with the second rack 132 and fixed with the other end of the tilting rod 154, so as to drive the passive gear 152 via the tilting rod 154. Therefore, when the third body 130 is tilted with respect to the first body 110, the tilting rod 154 can swing in the slot 152a as shown in FIG. 2D. Referring to FIG. 4, in the present embodiment, the tilting rod 154 penetrates the pivot member 140, such that the pivot member 140 is adapted to drive the tilting rod 154 to swing in the slot 152a as shown in FIG. 3A as being rotated with respect to the first body 110.

The gear sets 150 of the present embodiment may be reduction gear sets, such that the shift stroke of the third body 130 is greater than that of the second body 120. For example, when the third body 130 in the state of FIG. 2A shift a first distance with respect to the first body 110 along the first operating direction D1 and is transformed to the state of FIG. 2C, the third body 130 drives the second body 120 in the state of FIG. 2A via the gear sets 150 to shift a second distance with respect to the first body 110 along the second operating direction D2. Owing to the reduction of the gear sets 150, the second distance is smaller than the first distance, such that the strokes of the second body 120 and the third body 130 are matched up to accomplish the operation of the handheld electronic device 100.

When the operation ends up and the user want to retract the handheld electronic device 100, the elastic force of the elastic members 160 as shown in FIG. 4 is counteracted to press the third body 130 from the position in FIG. 2D to the position in FIG. 2C. Then, the third body 130 is pushed from the position in FIG. 2C to the position in FIG. 2A to accomplish the retraction of the handheld electronic device 100.

In the present application, the handheld electronic device 100 may further comprise a decorating ring 180. The decorating ring is disposed at the edge of the first body 110 and located between the first body 110 and the third body 130, so as to cover the gear sets 150 and the pivot members 140 in the states of FIGS. 2A through 2D and maintain the appearance of the handheld electronic device 100.

Accordingly, the second body of the application is stacked between the first and third bodies. The third body utilizes the gear set to drive the second body. This way, the third body and the second body move along opposite directions so that the second body is exposed by the third body. Next, the third body tilts relatively to the first body, combining the third body and the second body, so that the handheld electronic device has a larger usable surface. Furthermore, an elastic member is disposed between the pivot member and the first body to provide elastic force for driving the pivot member to rotate with respect to the first body. In addition, further an elastic member can be disposed between the pivot member and the third body to provide elastic force for driving the third body to shift with respect to the first body, so as to improve the convenience in operating the handheld electronic device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A handheld electronic device, comprising:
   a first body;
   a pivot member, pivoted on the first body;
   a second body, having a first rack and being slidably coupled with the first body;
   a third body, having a second rack and being slidably coupled with the pivot member, the second body is stacked between the first body and the third body; and
   a gear set, disposed on the first body and coupled with the first rack and the second rack, wherein when the third body shifts a first distance relative to the first body along a first operating direction and drives the gear set with the second rack, the second body is driven by the first rack to shift with respect to the first body along a second operating direction opposite to the first operating direction and exposed by the third body, and then the third body is tilted with respect to the first body by the pivot member pivoted on the first body.

2. The handheld electronic device as claimed in claim 1, wherein when the third body is tilted with respect to the first body, third body leans against the second body.

3. The handheld electronic device as claimed in claim 2, wherein the second body has a first displaying surface, the third body has a second displaying surface, and when the third body leans against the second body, the first displaying surface and the second displaying surface are adapted to displaying two interactive frames or two individual frames respectively, or together displaying a whole frame.

4. The handheld electronic device as claimed in claim 1, further comprising an elastic member connected between the first body and the pivot member, wherein when the second body is exposed by the third body, the pivot member rotates with respect to the first body by an elastic force of the elastic member and drives the third body to tilt with respect to the first body.

5. The handheld electronic device as claimed in claim 4, wherein the elastic member is a torsion spring.

6. The handheld electronic device as claimed in claim 1, further comprising an elastic member connected between the third body and the pivot member, wherein the elastic member is configured to store or release an elastic potential energy in the process of the third body shifting with respect to the first body.

7. The handheld electronic device as claimed in claim 1, wherein the gear set comprises:
   a passive gear, coupled with the first rack, the passive gear having a slot;
   a tilting rod, having an end disposed in the slot and adapted to swing with respect to the slot; and
   a driving gear, coupled with the second rack and fixed with the other end of the tilting rod to rotate the passive gear by the tilting rod, wherein when the third body is tilted with respect to the first body, the tilting rod swings with respect to the slot.

8. The handheld electronic device as claimed in claim 7, wherein the tilting rod penetrates the pivot member, and the pivot member rotates with respect to the first body to drive the tilting rod swinging along the slot.

9. The handheld electronic device as claimed in claim 1, wherein the gear set is a reduction gear set, the third body is adapted to shift a first distance with respect to the first body along the first operating direction, and the reduction gear set drives the second body to shift a second distance smaller than the first distance with respect to the first body along the second operating direction.

10. The handheld electronic device as claimed in claim 1, further comprising a decorating ring disposed at an edge of the first body and located between the first body and the third body to cover the gear set and the pivot member.

* * * * *